United States Patent
Grong et al.

(10) Patent No.: US 7,226,493 B2
(45) Date of Patent: Jun. 5, 2007

(54) METHOD FOR GRAIN REFINING OF STEEL, GRAIN REFINING ALLOY FOR STEEL AND METHOD FOR PRODUCING GRAIN REFINING ALLOY

(75) Inventors: Oystein Grong, Tiller (NO); Ole Svein Klevan, Orkanger (NO)

(73) Assignee: Elkem ASA, Oslo (NO)

( * ) Notice: Subject to any disclaimer, the term of this patent is extended or adjusted under 35 U.S.C. 154(b) by 561 days.

(21) Appl. No.: 10/182,237

(22) PCT Filed: Jan. 29, 2001

(86) PCT No.: PCT/NO01/00029

§ 371 (c)(1),
(2), (4) Date: Jul. 23, 2002

(87) PCT Pub. No.: WO01/57280

PCT Pub. Date: Aug. 9, 2001

(65) Prior Publication Data

US 2003/0010554 A1 Jan. 16, 2003

(30) Foreign Application Priority Data

Jan. 31, 2000 (NO) .................. 20000499

(51) Int. Cl.
C22C 1/03 (2006.01)
C22C 1/04 (2006.01)
C22C 33/02 (2006.01)
C22C 35/00 (2006.01)

(52) U.S. Cl. .................... 75/255; 75/303; 75/305; 75/312; 75/507; 75/352; 148/637; 420/590; 420/129

(58) Field of Classification Search ........... 75/255, 75/252, 352, 312, 303, 507; 420/129, 590; 148/403, 637
See application file for complete search history.

(56) References Cited

U.S. PATENT DOCUMENTS

| 2,168,561 | A | * | 8/1939 | Critchett et al. ............ 420/117 |
| 2,221,781 | A | * | 11/1940 | Critchett et al. ............. 75/303 |
| 3,383,202 | A | * | 5/1968 | Lynch ..................... 420/581 |
| 3,929,467 | A | * | 12/1975 | Davies et al. ............... 75/585 |
| 5,776,267 | A | * | 7/1998 | Nanba et al. .............. 148/328 |
| 5,908,486 | A | * | 6/1999 | Flinn et al. ................ 75/232 |

FOREIGN PATENT DOCUMENTS

EP 0984072 A1 3/2000

OTHER PUBLICATIONS

Stahlschlussel, 14. vollstandig neu bearbeitete und erweiterte Auflage, pp. 271-272, 1986.

* cited by examiner

*Primary Examiner*—Deborah Yee
(74) *Attorney, Agent, or Firm*—Lucas & Mercanti, LLP

(57) ABSTRACT

The present invention relates to a method for grain refining of steel. A grain refining alloy having a composition FeXY where X is one or more elements selected from the group consisting of Cr, Mn, Si, Ni, and Mo and where Y is one or more oxide and/or sulphide and or nitride and/or carbide forming elements selected from the group consisting of Ce, La, Nd, Pr, Ti, Al, Zr, Ca, Ba, Sr, Mg, C and N where X is between 0.001 and 99% by weight based on the weight of the alloy and where Y is between 0.001 and 50% by weight of the alloy, said alloy additionally containing between 0.001 and 2% by weight of oxygen and/or between 0.001 and 2% by weight of sulphur, said alloy containing at least $10^3$ inclusion particles per $mm^3$ consisting of oxides and/or sulphides and/or carbides and/or nitrides of one or more of the Y elements and/or one or more of the X elements Cr, Mn and Si in addition to Fe, said inclusion particles having a mean diameter of less than 10 μm, is added to molten steel in an amount of between 0.01 and 5% by weight based on the weight of the steel, whereafter the steel is cast. The invention further relates to a grain refining alloy for steel and to a method for producing grain refining alloys.

15 Claims, No Drawings

METHOD FOR GRAIN REFINING OF STEEL, GRAIN REFINING ALLOY FOR STEEL AND METHOD FOR PRODUCING GRAIN REFINING ALLOY

FIELD OF INVENTION

The present invention relates to a method for grain refining of steel, particularly ferritic and austenitic steels, a grain refining alloy for steel and to a method for producing a grain refining alloy. The alloy is designed for grain size control of shaped castings and slabs for further working to standard stocks (i.e. sheet, plate, tube, bar, wire or rod).

BACKGROUND ART

The demand for higher performance steels with optimal combination of properties is becoming more crucial. Since the grain size in steel controls the resulting properties, the desired property profile can be obtained by development of a properly adjusted microstructure.

As-cast steels are prime examples of materials where the properties achieved depend upon the characteristics of the solidification microstructure. In general, a coarse columnar grain structure will inevitably evolve upon solidification if potent heterogeneous nucleation sites ahead of the solidifying front are absent. In the presence of effective seed crystals, fine equiaxed grains form directly in the melt. Depending upon the circumstances, the equiaxed grain structure may completely override the inherent columnar grain formation, which, in turn, gives rise to an improved castability (e.g. hot ductility and hot cracking resistance) through a smaller grain size and reduced problems with centre-line segregation.

Experience has shown that the as-cast microstructures of high alloyed steels are quite different from those of the pure carbon manganese or low alloy steels due to their higher alloy content and broader span in chemical composition. Four distinct solidification modes are commonly observed:

Primary ferrite formation

Primary ferrite formation followed by a peritectic transformation to austenite

Primary ferrite and austenite formation

Primary austenite formation

Due to the absence of subsequent solid state phase transformations, there is particularly a need of grain refining in fully austenitic or ferritic steels. At present, no grain refiners are commercially available for steels, as opposed to cast iron and aluminum alloys where such remedies are widely used to refine the solidification microstructure.

Over the past decades, significant improvement of steel properties has been achieved through strict control of the chemical composition, volume fraction and size distribution of non-metallic inclusions. This has been made possible by the introduction of secondary steelmaking as an integrated step in the production route and the use of advanced ladle refining techniques for deoxidation and desulphurisation. The detrimental effect of inclusions on steel properties arises from their ability to act as initiation sites for microvoids and cleavage cracks during service. Hence, the use of clean steels is normally considered to be an advantage, both from a toughness and a fatigue point of view.

More recently, the beneficial effect of inclusions on the solid state transformation behaviour of steels has been highlighted and recognised. In particular, the phenomenon of intragranular nucleation of acicular ferrite at inclusions is well-documented in low alloy steel weld metals, where the best properties are achieved at elevated oxygen and sulphur levels owning to the development of a more fine-grained microstructure. The same observations have also been made in wrought steel products deoxidised with titanium, although the conditions existing in steelmaking are more challenging due to the risk of inclusion coarsening and entrapment of large particles that can act as initiation sites for cleavage cracks. Because of the problems related to control of the inclusion size distribution during deoxidation and casting, the concept of inclusion-stimulated ferrite nucleation have not yet found a wide application, but is currently limited to certain wrought steel products where the weldability is of particular concern.

Inclusions are known to play an important role in development of the steel solidification microstructure and substantial grain refining has been observed in a number of systems, including Aluminum-titanium deoxidised low alloy steels due to nucleation of delta ferrite at titanium oxide/nitride inclusions.

Aluminum-titanium deoxidised ferritic stainless steels due to nucleation of delta ferrite at titanium oxide/nitride containing inclusions.

Rare earth metal (REM) treated low alloy steels due to nucleation of delta ferrite at Ce/La containing oxides and sulphides.

Rare earth metal (REM) treated ferritic stainless steels due to nucleation of delta ferrite at Ce/La containing oxides and sulphides.

Rare earth metal (REM) treated austenitic stainless steels due to nucleation of austenite at Ce/La containing oxides and sulphides.

In all cases the grain refining effect is related to the ability of the inclusions to act as efficient heterogeneous nucleation sites, e.g. by providing a low lattice disregistry between the substrate and the nucleus. Experiments have shown that the undercooling required to trigger a nucleation event is of the order of 1° C. when the atomic misfit across the interface is 5% or lower. This degree of undercooling is sufficiently low to promote the formation of an equiaxed microstructure during solidification, provided that number density of the nucleating inclusions ahead of the advancing solid/liquid interface exceeds a certain threshold.

FeSi-based inoculants and treatment alloys for cast iron are commercially available and commonly used in the foundry industry. These alloys contain balanced additions of strong oxide and sulphide formers such as Ca, Al, Ce, La, Ba, Sr or Mg. It is well established that the major role of the minor elements is to modify the chemical composition and crystal structure of the existing inclusions in the liquid iron, thus promoting the graphite formation during solidification. This occurs by a process of heterogeneous nucleation analogous to that documented for grain nucleation in steel.

Experiments have shown that both low carbon (LC) FeCr and FeMn, produced by means of conventional casting methods, contain an intrinsic distribution of oxides and sulphides, the former group being most important. These systems have a high oxygen solubility in the liquid state (about 0.5% O by weight or higher), where the inclusions form naturally both prior to and during the casting operation owing to reactions between O and S and Cr, Si and Mn contained in the alloys. However, because the cooling rate associated with conventional sand mould casting is low, the resulting size distribution of the $Cr_2O_3$, $SiO_2$, MnO or MnS oxide and sulphide inclusions is rather coarse. Typically, the size of the inclusions in commercial LC FeCr and FeMn is between 10 and 50 µm, which make such alloys unsuitable for grain refining of steel.

Controlled laboratory experiments have shown that the additions of a strong oxide and sulphide former such as Ce to a liquid ferrous alloy will result in the formation of $Ce_2O_3$ and CeS. These inclusions are similar to those observed in steels treated with rare earth metals, and in both cases extensive grain refinement is achieved. The initial size of the inclusions obtained with this conventional alloying technique is between 1 and 4 µm. However coarsening of the inclusion population occurs gradually with time after the Ce addition, and unless the melt is rapidly quenched thereafter the inclusions will grow large and eventually become detrimental to mechanical properties. Thus, the real challenge is either to create or introduce small non-metallic inclusions in the liquid steel that can act as heterogeneous nucleation sites for different types of microstructures during solidification and in the solid state (e.g. ferrite or austenite), without compromising the resulting ductility or fracture toughness. In practice, this can be achieved by the use of a novel alloying technique, based on additions of tailor made grain refining alloys to liquid steel where the necessary reactants or seed crystals are embedded.

DISCLOSURE OF INVENTION

It is an object of the present invention to provide a method for grain refining of steels, particularly ferritic and austenitic steels, by adding certain grain refining alloys to molten steel before or during casting, to provide a grain refining alloy for the use in grain refining of such steels and to provide a method for production of a grain refining alloy.

Thus according to a first aspect, the present invention relates to a method for grain refining of steel, particularly ferritic and austenitic steels, which method is characterised in that a grain refining alloy having a composition FeXY where X is one or more elements selected from the group consisting of Cr, Mn, Si, Ni and Mo, and where Y is one or more oxide and/or sulphide and/or nitride and/or carbide forming elements selected from the group consisting of Ce, La, Nd, Pr, Ti, Al, Zr, Ca, Ba, Sr, Mg, C and N where X is between 0.001 and 99% by weight based on the weight of the alloy and where Y is between 0.001 and 50% by weight of the alloy and said alloy additionally containing between 0.001 and 2% by weight of oxygen and/or between 0.001 and 2% by weight of sulphur, said alloy containing at least $10^3$ inclusion particles per $mm^3$ consisting of oxides and/or sulphides and/or carbides and/or nitrides of one or more of the Y elements and/or one or more of the X elements Cr, Mn and Si in addition to Fe, said inclusion particles having a mean diameter of less than 10 µm, is added to molten steel in an amount of between 0.01 and 5% by weight based on the weight of the steel, whereafter the steel is cast.

According to a preferred embodiment the FeXY alloy added to the molten steel contains at least 1% by weight of the X elements.

According to another preferred embodiment the FeXY alloy added to the molten steel contains between 5 to 50% by weight of Fe, 20 to 94% by weight of the X elements, and 0.01 to 30% by weight of the Y elements. The content of oxygen and/or sulphur is preferably between 0.01 and 1% by weight based on the weight of the alloy.

According to another preferred embodiment the grain refining alloy added to the molten steel contains at least $10^5$ inclusion particles per $mm^3$ where the said inclusion has a mean diameter of less than 2 µm.

According to yet another preferred embodiment the grain refining alloy is added to molten steel in an amount between 0.1 and 1.5% by weight based on the weight of steel.

In order to obtain the best results; that is either to create or introduce small inclusions in the steel melt that can act as heterogeneous nucleation sites for different microstructures during subsequent steel processing, it is important that the liquid steel is properly treated using one or more grain refining alloys that are added in succession in order to maximise the grain refining effect. The grain refining alloy is therefore added to the molten steel either in the ladle, in tundish and/or just before or during casting, or directly in the casting mould following primary steel deoxidation. When the grain refining alloy is added to the molten steel in the ladle or the tundish it is preferred to add the alloy in the form of a particulate alloy having a particle size between 0.2 and 20 mm, preferably between 0.5 and 5 mm. When a grain refining alloy containing a fine distribution of small inclusions according to the present invention is added to the molten steel in the casting mould it is preferred to add the alloy in the form of a cored wire which is continuously added to the steel at a controlled rate. In order to maximise the grain refining effect the cored wire addition should be made as the last step before casting; that is after any adjustment of the steel composition and after other preconditioning step like deoxidation, previous grain refining alloy additions or the like.

It has been verified that by the method of the present invention a high number of very small oxide and/or sulphide and/or nitride and/or carbide inclusion particles are either created or introduced in the molten steel. These inclusion particles can act as active nucleation sites during the subsequent solidification on which the new grains will grow epitaxially until they impinge on and obstruct the growth of the columnar grains. This results in a wider equiaxed zone with a smaller grain size and/or a shorter dendrite arm spacing in the as-cast steel. It has also been found that the inclusion particles either created or introduced in the steel via the grain refining alloys influence the microstructure evolution in the solid state by affecting the steel recrystallisation and grain growth behaviour and/or by promoting intragranular nucleation of ferrite or austenite. This leads to additional grain refining during thermomechanical processing and welding of the steels, particularly in grades that undergo a subsequent transformation in the solid state.

According to a second aspect, the present invention relates to an alloy for grain refining of steel, particularly ferritic and austenitic steels, characterised in that the grain refining alloy has a composition FeXY where X is one or more elements selected from the group consisting of Cr, Mn, Si, Ni, and Mo, and where Y is one or more oxide and/or sulphide and/or nitride and/or carbide forming elements selected from the group consisting of Ce, La, Nd, Pr, Ti, Al, Zr, Ca, Ba, Sr, Mg, C and N where X is between 0.001 and 99% by weight based on the weight of the alloy and where Y is between 0.001 and 50% by weight of the alloy and said alloy additionally containing between 0.001 and 2% by weight of oxygen and/or between 0.001 and 2% by weight of sulphur, said alloy containing at least $10^3$ inclusion particles per $mm^3$ consisting of oxides and/or sulphides and/or carbides and/or nitrides of one ore more of the Y elements and/or one or more of the X elements Cr, Mn and Si in addition to Fe, said inclusion particles having a mean diameter of less than 10 µm.

According to a preferred embodiment the grain refining alloy contains at least 1% by weight of the X elements.

According to another preferred embodiment the grain refining alloy contains between 5 to 50% by weight of Fe, 20 to 94% by weight of the X elements and 0.01 to 30% by weight of the Y elements. The content of oxygen and/or sulphur is preferably between 0.01 and 1% by weight based on the weight of the alloy.

According to another preferred embodiment the grain refining alloy contains at least $10^5$ inclusion particles per $mm^3$ where the said inclusion particles have a mean diameter of less than 2 μm.

The grain refining alloy according to the present invention containing the desired constituent elements and inclusion size distribution is crushed and screened to a particle size between 0.2 and 20 mm before it is used as a grain refiner. The grain refining alloy is either added to the steel in a particulate form or in the form of a cored wire where the cored wire containing the grain refining alloy is produced in conventional way. The cored wire contains a properly adjusted size distribution of the crushed particles to obtain the desired packing density and dissolution characteristics for a late addition in the casting mould. If desirable, sulphide and/or oxide-containing compounds can be mechanically or chemically mixed with the crushed grain refiner and added to the liquid steel via the cored wire.

By selecting a proper combination of X and Y elements in the grain refining alloy and exercising strict control of the inclusion composition, number density and size distribution, the grain refining alloy can be tailor made for any steel composition. Thus the grain refining alloy of the present invention is very flexible and can, particularly by selecting the X elements in the alloy, be used to obtain a grain refined steel having the correct amount of alloying elements for a particular steel.

According to a third aspect, the present invention relates to a method for producing a grain refining alloy for steel, said method being characterised by the following steps:

providing a molten FeX alloy where X is one or more elements selected from the group consisting of Cr, Mn, Si, Ni, and Mo in an amount between 0.001 and 99% by weight of the FeX alloy, the reminder except for impurities being Fe;

providing a FeXY alloy in molten or solid, particulate state where X is one or more elements selected from the group consisting of Cr, Mn, Si, Ni, and Mo in an amount between 0.001 and 99% by weight of the FeXY alloy and where Y is one or more elements selected from the group consisting of Ce, La, Nd, Pr, Ti, Al, Zr, Ca, Ba, Sr, Mg, C and N in an amount of between 0.001 and 90% by weight of the FeXY alloy;

optionally adding an oxide and/or a sulphur-containing compound to the molten FeX alloy to obtain between 0.002 and 4% by weight of O and/or between 0.002 and 4% by weight of S dissolved in the molten alloy;

mixing the molten FeX alloy and the molten or solid FeXY alloy in such amounts that it is obtained a resulting molten alloy consisting of 0.001 to 99% by weight of one or more elements selected from the group consisting of Fe, Cr, Mn, Si, Ni and Mo, 0.001 to 50% by weight of one or more elements selected from the group consisting of Ce, La, Nd, Pr, Ti, Al, Zr, Ca, Ba Sr, Mg, C and N, 0.001 to 2% by weight of O and/or 0.001 to 2% by weight of S, the reminder being impurity elements, and;

solidifying the resultant molten alloy by casting or quenching to form a solid alloy having at least $10^3$ inclusion particles pr. $mm^3$ consisting of oxides and/or sulphides and/or carbides and/or nitrides or one or more of the Y elements and/or one or more of the X elements Cr, Mn and Si in addition to Fe, said inclusion particles having a mean diameter of less than 10 μm.

According to a preferred embodiment the molten FeX alloy and the molten FeXY alloy are heated to a temperature of at least 50° C. above their melting points before the molten FeX alloy and the molten FeXY alloy are mixed.

According to another embodiment the molten FeX alloy is heated to a temperature of at least 50° C. above its melting point before the solid, particulate FeXY alloy is mixed with the molten FeX alloy.

According to another preferred embodiment the mixing of the molten FeX alloy and the molten FeXY alloy is done by pouring the two melts simultaneously in such a way that the two melts are brought into intimate contact with each other.

According to yet another embodiment the pouring and mixing of the two melts are carried out inside a closed chamber.

According to yet another embodiment the resulting molten alloy is immediately after mixing of the two melts transferred to a separate holding ladle to promote slag/metal phase separation and for removal of any large inclusions before the melt is being cast or quenched.

The casting or quenching can either be done using a mould, a water-cooled copper chill, or a casting belt, by water granulation, by water atomization, by gas atomization or by other conventional fast quenching media.

Experience has shown that it is possible to obtain a fine distribution of oxides and/or sulphides and/or nitrides and/or carbides containing the Y elements and/or one or more of the X elements Cr, Mn and Si in addition to Fe by controlling the cooling rate of the alloy prior to and during solidification. Thus by the use of an appropriate melt mixing, casting and/or quenching procedure it is possible to obtain as many as $10^7$ inclusion particles per $mm^3$ or higher in the grain refining alloy produced according to the present invention.

Some embodiments of the present invention will now be further described by way of examples.

EXAMPLE 1

Manufacturing Of Grain Refining Alloys

Two different grain refining alloys were manufactured according to the method of the present invention.

Grain Refiner 1

A first grain refining alloy called Grain Refiner 1 was produced as follows:

A Fe—Cr base alloy containing approximately 65% by weight Cr, 0.05% by weight C, 0.5% by weight Si and 0.01% by weight S was melted in an induction furnace, using a MgO crucible. The melt was superheated to about 1700° C., which is approximately 50° C. above the liquidus temperature of the alloy. A silicon-rich and a cerium-rich source were then added in a particulate form to this melt in succession in order to obtain a new liquid Fe—Cr—Si—Ce alloy. This alloy was subsequently quenched in a graphite mould, crushed and screened to yield a particle size between 0.5 and 4 mm. An analysis of the screened material gave the following result: 31.9% by weight Cr, 15.8% by weight Si, 8.5% by weight Ce, 1.18% by weight C, 0.37% by weight O and 0.002% by weight S, the remainder being Fe and other impurity elements. Moreover, subsequent optical and scanning electron microscope (SEM) examinations of the screened material revealed evidence of a duplex microstructure consisting of one Cr, Si and Fe-rich phase and one Ce, Si and Fe-rich phase. At the same time faceted Si, Mg and Al-containing non-metallic inclusions were present in the matrix with a mean size of about 5 μm and a local number density being higher than $10^3$ particles per $mm^3$.

Grain Refiner 2

A second grain refining alloy called Grain Refiner 2 was produced according to the following procedure:

A Fe—Cr base alloy containing approximately 65% by weight Cr, 0.05% by weight C, 0.5% by weight Si and 0.01% by weight S was melted in an induction furnace, using a MgO crucible. The melt was superheated to about 1700° C., which is approximately 50° C. above the liquidus temperature of the alloy. Iron oxide in a particulate form was then added to this liquid melt to achieve oxygen saturation and incipient chromium oxide formation. A second Fe—Cr—Si—Ce alloy was melted in parallel in another induction furnace. The second alloy was superheated to a temperature of more than 100° C. above the liquidus temperature of the alloy. The two melts were subsequently mixed by pouring the liquid Fe—Cr—Si—Ce alloy into the liquid oxygen-saturated Fe—Cr alloy. After mixing, the resulting molten ally was quenched in a graphite mould, crushed and screened to yield a particle size between 0.25 and 2 mm. An analysis of the solid bottom part of the as-cast material gave the following result: 52.7% by weight Cr, 6.7% by weight Si, 0.85% by weight Ce, 0.66% by weight C and 0.05% by weight O, the remainder being Fe and other impurity elements. Moreover, subsequent optical scanning electron microscope (SEM) examinations of the produced grain refining alloy revealed evidence of both TiN and Ce-rich faceted inclusions embedded in the matrix with a mean size less than 2 μm and a number density which locally exceeded $10^7$ particles per $mm^3$. Thus, by using two melts, one saturated with oxygen and one containing the reactive elements, mixing the melts and quenching the mixed melt, it is possible to tailor-make the grain refining alloy as to chemical composition, crystal structure, size distribution and number density of the inclusion particles.

EXAMPLE 2

Grain Refining Of Steel

The steels used in the grain refining of steel in this example 2 approximately comply with the duplex (austenite-ferrite) variant AISI 329 (or DIN 1.4460), having the following range in chemical composition; 25-28% by weight Cr, 4.5-6.5% by weight Ni, 1.3-2.0% by weight Mo, max 2.0% by weight Mn, max 1.0% by weight Si, max 0.03% by weight S, max 0.04% by weight P and max 0.1% by weight C. A charge of about 800 kg was prepared by induction melting of appropriate scrap material, which was subsequently alloyed with chromium, nickel and molybdenum to achieve the above target chemical composition. The temperature of the liquid steel was between 1580 and 1590° C.

Reference Steel Casting (Prior Art)

A reference casting was produced by pouring about 100 kg of liquid steel from the induction furnace into a separate holding ladle. During this operation 0.5 kg of FeSi was added to the molten steel for deoxidation purposes. After a short holding period 30 kg of the melt was poured into a sand mould to produce a shaped casting with the following cross sectional dimensions; height: 25 mm, smallest width: 25 mm, largest width: 30 mm. Following solidification and subsequent cooling down to room temperature, the steel casting was cleaned and then heat treated at 1000° C. for 30 minutes in a furnace to better reveal the as-cast microstructure. An analysis of the steel chemical composition gave the following result; 24.7% by weight Cr, 6.0% by weight Ni, 1.7% by weight Mo, 0.90% by weight Mn, 1.11% by weight Si, 0.003% by weight S, 0.024% by weight P, 0.07% by weight C, 0.01% by weight Al, 0.01% by weight Ti, <0.001% by weight Ce, 0.063% by weight N and 0.024% by weight O. Standard metallographic techniques were then employed to reveal the resulting grain structure in the cross section of the casting. This procedure involved cutting, grinding, polishing and etching in Vilella (5 ml HCl+1 g picric acid+100 ml ethanol). Optical microscope examination showed evidence of columnar grains at the surface and coarse equiaxed grains in the interior of the casting with a mean grain size larger than 2 mm. Moreover, the subsequent examination of the reference steel in the scanning electron microscope (SEM) showed that the inclusions were manganese silicates containing small amounts of aluminum and sulphur (probably in the form of MnS). The mean size of these inclusions was 2.9 μm and the estimated inclusion number density was about $10^5$ per $mm^3$.

Steel Casting Grain Refined According To The Invention

A steel casting was produced by pouring about 100 kg of liquid steel from the induction furnace into a separate holding ladle. During this operation, 0.5 kg of FeSi and 1.8 kg of the experimental Grain Refiner 1 were added in succession for deoxidation and inclusion engineering purposes, respectively. After a short holding period 30 kg of the melt was poured into a sand mould to produce a shaped casting with the following cross sectional dimensions; height: 25 mm, smallest width: 25 mm, largest width: 30 mm. Following solidification and subsequent cooling down to room temperature, the steel casting was cleaned and then heat treated at 1000° C. for 30 minutes in a furnace to better reveal the as-cast microstructure. A check analysis of the steel chemical composition gave the following result; 24.8% by weight Cr, 5.9% by weight Ni, 1.7% by weight Mo, 0.92% by weight Mn, 1.44% by weight Si, 0.002% by weight S, 0.024% by weight P, 0.079% by weight C, 0.01 % by weight Al, 0.015 weight Ti, 0.08% by weight Ce, 0.067% by weight N and 0.028% by weight O. Standard metallographic techniques were then employed to reveal the resulting grain structure in the cross section of the casting. This procedure involved cutting, grinding, polishing and etching in Vilella (5 ml HCl+1 g picric acid+100 ml ethanol). Optical microscope examination showed no evidence of columnar grains close to the surface and fine equiaxed grains in the interior of the casting with a mean grain size of about 0.4 to 0.5 mm. The largest equiaxed grain size was about 1 mm. Moreover, the subsequent examination of the experimental steel in the scanning electron microscope (SEM) showed that the inclusions were faceted Ce-based oxides containing small amounts of silicon. Some of these inclusions appeared in the form of large clusters. The mean size of all inclusions was 2.3 μm and the estimated inclusion number density was about $2\times10^5$ per $mm^3$. The presence of these Ce-based oxide inclusions which form in the liquid steel as a result of the addition of Grain Refiner 1 creates favourable conditions for nucleation and growth of ferrite during solidification and subsequent cooling in the solid state.

EXAMPLE 3

Grain Refining Of Steel Ingot For Forging Operations

The steels used in these grain refining experiments comply with the fully austenitic stainless steel variant 254 SMO (or DIN 1.4547), having the following range in chemical composition; 19.5-20.5% by weight Cr, 17.5-18.5% by weight Ni, 6.0-7.0% by weight Mo, max 1.0% by weight Mn, max 0.7% by weight Si, max 0.010% by weight S, max 0.030% by weight P and max 0.02% by weight C. Two different heats, each consisting of about 5 tons of liquid steel, were prepared in an AOD converter using the appropriate charge materials. After transfer to the tapping ladle the melt temperature was about 1590° C.

Reference Steel Ingot (Prior Art)

Solid rods of mischmetal were added to the liquid steel in the tapping ladle as the final preconditioning step. Shortly thereafter the steel was cast in an iron mould, using a conventional assembly for bottom pouring. The total weight of the ingot was 3.4 tons and the dimensions were as follows; height: 2050 mm, upper cross section: 540×540 mm, bottom cross section: 450×450 mm. After filling the mould with liquid steel exothermic powder was added on the top of the ingot in order to minimize piping. An analysis of the steel chemical composition gave the following result; 20.1% by weight Cr, 17.6% by weight Ni, 6.2% by weight Mo, 0.49% by weight Mn, 0.54% by weight Si, 0.001% by weight S, 0.022% by weight P, 0.03% by weight C, 0.01% by weight Al, 0.01 w % by weight Ti, 0.01% by weight Ce, 0.005% by weight La, 0.19% by weight N and 0.005% by weight O. Following solidification and subsequent cooling down to room temperature, the steel ingot was sectioned about 500 mm from the top of the casting. Metallographic samples were taken from three different positions in the length direction of the ingot at this height, i.e. surface position, 70 mm from the surface and in the centre. Standard metallographic techniques were then employed to reveal the resulting grain size and the dendrite structure in these positions. Specifically, the procedure involved grinding, polishing and etching in Vilella (5 ml HCl+1 g picric acid+100 ml ethanol). Optical microscope examination showed no evidence of a chill zone close to the surface of the ingot. At a position 70 mm away from the surface coarse, equiaxed grains with a corresponding coarse dendrite substructure could be observed. The solidification microstructure became gradually coarser towards the centre of the ingot. Moreover, the subsequent examination of the reference steel in the scanning electron microscope (SEM) showed that the inclusions were La—Ce-based oxide particles with a mean size of about 2.8 µm and an estimated inclusion number density of about $10^5$ per mm$^3$.

Steel Ingot Grain Refined According To The Invention

In this case 3.5 kg of the Grain Refiner 1 was added per ton of liquid steel in the tapping ladle as the final preconditioning step as a replacement of the mischmetal additions. Shortly thereafter the steel was cast in an iron mould, using a conventional assembly for bottom pouring. The total weight of the ingot was 3.4 tons and the dimensions were as follows; height: 2050 mm, upper cross section: 540×540 mm, bottom cross section: 450×450 mm. After filling the mould with liquid steel exothermic powder was added on the top of the ingot in order to minimize piping. An analysis of the steel chemical composition gave the following result; 20.2% by weight Cr, 17.7% by weight Ni, 6.1% by weight Mo, 0.58% by weight Mn, 0.39% by weight Si, 0.001% by weight S, 0.025% by weight P, 0.02% by weight C, 0.01% by weight Al, 0.01% by weight Ti, 0.01% by weight Ce, <0.001% by weight La, 0.21% by weight N and 0.01% by weight O. Following solidification and subsequent cooling down to room temperature, the steel ingot was sectioned about 500 mm from the top of the casting. Metallographic samples were taken from three different positions in the length direction of the ingot at his height, i.e. surface position, 70 mm from the surface and in the centre. Standard metallographic techniques were then employed to reveal the resultant grain size and the dendrite structure in these positions. Specifically, the procedure involved grinding, polishing and etching in Vilella (5 ml HCl+1 g picric acid+100 ml ethanol). Optical microscope examination revealed an extremely fine grain size within the chill zone, i.e. from 0.05 to 0.1 mm on the average, from which the coarser columnar grains grew into the interior of the ingot. At a position 70 mm away from the surface only coarse equiaxed grains were observed. However, each of these grains consisted of a very fine-masked network of dendrites, where the dendrite arm spacing was approximately a factor of three smaller than that observed in the reference steel ingot treated with mischmetal. Also in the centre of the casting the grain refining effect was substantial compared with the reference ingot, and at this position the dendrite arm spacing was approximately a factor of two smaller in favour of the steel ingot grain refined according to the present invention. Moreover, the subsequent examination of the grain refined steel in scanning electron microscope (SEM) revealed that the inclusions were faceted Ce—Al based oxide particles with a mean size of about 2.7 µm and an estimated inclusion number density of about $2×10^5$ per mm$^3$. The observed change in the solidification microstructure, which is caused by the addition of the Grain Refiner 1 in replacement of mischmetal, is due to the formation of faceted Ce—Al based oxide particles in the experimental steel ingot. These oxide particles provide favourable conditions for nucleation and growth of austenite during solidification and subsequent cooling in the solid state.

The invention claimed is:
1. Method for grain refining of steel, comprising:
providing a grain refining alloy having a composition FeXY where X is one or more elements selected from the group consisting of Cr, Mn, Si, Ni and Mo and where Y is one or more oxide and/or sulphide and/or nitride and/or carbide forming elements selected from the group consisting of Ce, La, Nd, Pr, Ti, Al, Zr, Ca, Ba, Sr, Mg, C and N where X is between 0.001 and 99% by weight based on the weight of the alloy and where Y is between 0.001 and 50% by weight of the alloy, said alloy additionally containing between 0.001 and 2% by weight of oxygen and/or between 0.001 and 2% by weight of sulphur;
quenching said alloy in a molten state such that said alloy contains at least $10^3$ inclusion particles per mm$^3$ consisting of oxides and/or sulphides and/or nitrides and/or carbides of one or more of the Y elements and/or one or more of the X elements Cr, Mn and Si in addition to Fe, said inclusion particles having a mean diameter of less than 10 μm, adding said quenched alloy to molten steel in an amount of between 0.01 and 5% by weight based on the weight of the steel; and casting said steel.

2. Method according to claim 1, wherein the FeXY alloy added to the molten steel contains at least 1% by weight of X elements.

3. Method according to claim 1, wherein the FeXY alloy added to the molten steel contains 5 to 50% by weight Fe, 20 to 94% of the X elements, and 0.01 and 30% by weight of the Y elements and the content of oxygen and/or sulphur is between 0.01 and 1% by weight based on the weight of the alloy.

4. Method according to claim 1, wherein the FeXY alloy added to the molten steel contains at least $10^5$ inclusion particles per mm$^3$ where the said inclusion particles have a mean diameter of less than 2 μm.

5. Method according to claim 1, wherein the grain refining alloy is added to the molten steel in an amount between 0.1 and 1.5% by weight based on the weight of steel.

6. Method according to claim 1, wherein the grain refining alloy is added to the molten steel in a ladle or a tundish just before or during casting.

7. Method according to claim 1, wherein the grain refining alloy is added to the molten steel in a casting mould.

8. An alloy having a particle size between 0.2 and 20 mm for grain refining of steel, wherein the alloy has a composition FeXY, where X is one or more elements selected from the group consisting of Cr, Mn, Si, Ni and Mo and where Y is one or more oxide and/or sulphide and/or nitride and/or carbide forming elements selected from the group consisting of Ce, La, Nd, Pr, Ti, Al, Zr, Ca, Ba, Sr, Mg, C and N, where said alloy contains between 5 and 50% by weight Fe based on the weight of the alloy, where X is between 20 and 94% by weight based on the weight of the alloy and where Y is between 1.51 and 30% by weight of the alloy, and said alloy additionally containing between 0.01 and 1% by weight of oxygen and/or between 0.01 and 1% by weight of sulphur, said alloy being produced by quenching said alloy in a molten state such that said alloy contains at least $10^3$ inclusion particles per mm$^3$ consisting of oxides and/or sulphides and/or nitrides and/or carbides of one or more of the Y elements and/or one or more of the X elements Cr, Mn and Si in addition to Fe, said inclusion particles having a mean diameter of less than 10 μm.

9. Alloy according to claim 8, wherein the alloy contains at least $10^5$ inclusion particles per mm$^3$ where the said inclusion particles have a mean diameter of less than 2 μm.

10. Method for producing a grain refining alloy for steel, comprising the following steps:

providing a molten FeX alloy where X is one or more elements selected from the group consisting of Cr, Mn, Si, Ni and Mo, in an amount between 0.001 and 99% by weight of the base FeX alloy, the reminder except for impurities being Fe;

providing a FeXY alloy in molten or solid, particulate state where X is one or more elements selected from the group consisting of Cr, Mn, Si, Ni and Mo in an amount between 0.001 and 99% by weight of the FeXY alloy and where Y is one or more element selected from the group consisting of Ce, La, Nd, Pr, Ti, Al, Zr, Ca, Ba, Sr, Mg, C and N in an amount between 0.001 and 90% by weight of the FeXY alloy;

optionally adding an oxide and/or sulphur or a sulphur-containing compound to the molten FeX alloy to obtain between 0.002 and 4.0% by weight of O and/or between 0.002 and 4.0% by weight of S dissolved in the molten alloy;

mixing the molten FeX alloy and the molten or solid FeXY alloy in such amounts that it is obtained a resulting molten alloy consisting of 0.001 to 99% by weight of one or more elements selected from the group consisting of Cr, Mn, Si, Ni and Mo, 0.001 to 50% by weight of one or more elements selected from the group consisting of Ce, La, Nd, Pr, Ti, Al, Zr, Ca, Ba, Sr, Mg, C and N, 0.001 to 2% by weight of O and/or 0.001 to 2% by weight of S, the reminder except for normal impurities being Fe, and;

solidifying the resultant molten alloy by quenching to form a solid alloy having at least $10^3$ inclusion particle per mm$^3$ consisting of oxides and/or sulphides and/or nitrides and/or carbides of one or more of the Y elements and/or one or more of the X elements Cr, Mn and Si, in addition to Fe, said inclusion particles having a mean diameter of less than 10 μm; and crushing the solid alloy to yield particle having a size between 0.2 mm-20 mm.

11. Method according to claim 10, wherein the molten FeX alloy and the molten FeXY alloy are heated to a temperature of at least 50 C above their melting points before the molten FeX alloy and the molten FeXY alloy are mixed.

12. Method according to claim 10, wherein the molten FeX alloy is heated to a temperature of at least 50° C. above its melting point before the solid, particulate FeXY alloy is mixed with the molten FeX alloy.

13. Method according to claim 11, wherein the mixing of the molten FeX alloy and the molten FeXY alloy is done by pouring the two melts simultaneously in such a way that the two melts are brought into intimate contact with each other.

14. Method according to claim 13, characterized in that the pouring and mixing of the two melts are carried out in a closed chamber.

15. Method according to claim 10, wherein the resulting molten alloy immediately after mixing is transferred to a separate holding ladle to promote slag/metal separation and for removal of any large inclusions before the melt is being quenched.

* * * * *